Patented Jan. 2, 1951

2,536,085

UNITED STATES PATENT OFFICE 2,536,085

PREPARATION OF GEL-TYPE DEHYDROGENATION CATALYST

Emory W. Pitzer, Bartlesville, Okla., assignor to Phillips Petroleum Company, a corporation of Delaware No Drawing. Application October 28, 1946, Serial No. 706,091

13 Claims. (Cl. 252—465)

This invention relates to an improved catalyst for hydrocarbon conversion and, more particularly, to a catalyst especially adapted to changing the carbon-to-hydrogen ratio of $C_2$—$C_8$ hydrocarbons. This invention relates further to improved hydrogenation and dehydrogenation processes utilizing such catalyst. The present invention also relates to an improved process for the preparation of a hydrocarbon conversion catalyst of the gel type. The present invention is particularly suited to the preparation of coprecipitated gels, for example, chromia-alumina gels and alumina-chromia-beryllia gels. Catalysts prepared in accordance with this invention have higher activity, longer lives, and, apparently, greater surface area per unit of mass than coprecipitated-gel catalysts prepared by previously known methods.

Various hydrocarbons, particularly those containing from two to eight carbon atoms per molecule, must frequently be dehydrogenated to produce more unsaturated materials suitable for various purposes in the chemical and petroleum industries. Such reactions include dehydrogenation of butane to produce butylenes, dehydrogenation of butylenes to produce butadiene, dehydrogenation of other paraffins to produce the corresponding olefins, and the dehydrogenation of other olefins to produce the corresponding diolefins. Conversely, it is frequently desirable to effect hydrogenation of unsaturated material to produce more saturated products, for example, the hydrogenation of aromatic hydrocarbons to produce cyclo-aliphatic hydrocarbons, and hydrogenation of petroleum fractions containing olefinic materials to effect saturation thereof.

As catalyst for such reactions, refractory metal oxides and mixtures thereof, in various forms, have been used. Such catalysts include, for example, alumina-containing gels, such as chromia-alumina, silica-alumina, etc. Various heavy metals and metal oxides have been used as hydrogenation and dehydrogenation catalysts either alone or in admixture with catalytic or non-catalytic materials. Various procedures for the preparation of catalysts have been heretofore employed. These include coprecipitation of concentrated sols to produce gel catalysts, mechanical mixing of components of composite catalysts, and deposition of active catalytic material on non-catalytic or less active catalytic materials. Particularly effective catalyst for these reactions are those containing a mixture of the oxides of chromium and aluminum. These catalysts, while quite effective, leave considerable room for improvement, as to degree of activity, effective life, efficiency, per pass conversion rate, stability to regeneration, etc. Conventional alumina-containing catalysts appear to lose activity on regeneration due to the formation therein of alpha-alumina, an inactive form of aluminum oxide. This inactive form appears to result from subjecting the catalyst to successive high temperatures, as in regeneration. This phenomenon appears to occur to an appreciable extent in chromia-alumina catalysts of the gel type, especially those which are particularly useful for dehydrogenation reactions.

In the past, precipitation of the gelatinous hydrous oxides has been effected by the preparation of separate sols from the metal salts by the addition of a controlled amount of an alkali, for example, ammonium hydroxide; mixing the sols; and completion of the precipitation by addition of an excess of dilute alkali to the sol mixture. Precipitation in this manner is generally carried out by the portionwise addition of small increments of dilute ammonium hydroxide over a period of several hours, first to the separate solutions to form sols and then to the mixed sols to form the coprecipitated gel. Another procedure which is said to be effective for the coprecipitation of mixed metal salts in an aqueous solution involves continuous precipitation by flowing the solution to a mixing zone, then after some time lag, introducing a stream of precipitants to the mixing zone at a rate such that the precipitant is never present in the zone in the amount required for complete precipitation of the salt.

I have now found, contrary to teachings of the prior art, that a coprecipitated gel of uniform composition may be prepared by the rapid addition of a precipitant to a solution of mixed metal salts. In the present procedure, rapid precipitation is effected in one step by the addition of concentrated precipitant, preferably ammonium hydroxide, to the dilute metal salt mixture at a relatively high rate. By the process of the present invention, precipitation of the gel is accomplished without the necessity of the formation of separate sols and without the necessity of special mixing techniques during the precipitation from the solution. The alumina-containing catalyst prepared by my improved method shows extraordinary resistance to the formation of inactive alpha-alumina upon regeneration.

I have now discovered an improved method for the preparation of a gel-type catalyst whereby the catalyst may be prepared in commercial quantities in a rapid and efficient manner. This invention is particularly effective for the production of gel catalysts containing alumina as the major component. A gel catalyst prepared by the procedure disclosed herein is more active and more efficient than a gel catalyst of the same composition prepared by conventional methods. The process disclosed herein may be effectively used for the preparation of the chromia-alumina-beryllia gel catalyst disclosed in the copending application of James R. Owen, Serial Number 641,416, filed January 15, 1946 now Patent 2,483,929. These catalysts show satisfactory resistance to destruction of their amorphous gel structure and only slight formation of alpha-alumina. A chromia-alumina-beryllia gel prepared in accordance with the present invention has an extremely high surface area per unit of mass and a higher efficiency and longer life than catalysts of similar composition prepared by admixing the metal oxides or by impregnation of alumina with salts of chromium and beryllium.

An object of the present invention is to provide a novel catalyst particularly adapted to hydrocarbon conversions wherein the carbon-to-hydrogen ratio of the hydrocarbons is changed. A further object of the present invention is to provide a novel catalyst for the dehydrogenation of paraffins and olefins. Another object is to provide an improved process for the preparation of gel-type catalysts. Still another object of the invention is to provide an improved process for the conversion of hydrocarbons utilizing the catalysts of this invention.

In methods of preparation previously used, the metal salt has been precipitated from the sols, the precipitate separated from the solute or dispersing liquid by filtration, and washed with water. It has now been found that it is desirable to have ammonium nitrate present in the catalyst preparation mixture until the final ignition step. I have found that the customary practice of removing the extraneous salts from the precipitate by washing with water is detrimental to the catalyst. Washing with water not only removes any ammonium nitrate present but also may remove traces of water-soluble complex salts that promote dehydrogenation. Washing with water also tends, apparently, to cause structural rearrangements that decrease the surface area of the catalyst. Thus in the present invention, by omitting the customary washing step, the activity of the catalyst is improved.

I have found, as indicated above, that a high concentration of ammonium nitrate in the coprecipitated gel is desirable; the presence of ammonium nitrate results in increased activity of the gel catalyst. Catalytic activity is improved when ammonium nitrate is included in the gel structure; however, the simple addition of ammonium nitrate to the finished catalyst fails to increase the activity of the catalyst. Thus, the presence of ammonium nitrate on the surface of the dry gel particles does not improve the catalytic properties of the gel. Inclusion of ammonium nitrate in the gel mass in accordance with my invention may be effected by adding ammonium nitrate to the initial solution of metal salts, preferably metal nitrates. When coprecipitated-gel catalysts are prepared by the formation of sols, for example, by the process disclosed by James R. Owen above referred to, the ammonium nitrate may be added to the sol mixture; in accordance with this invention deliberately controlled sol formation is preferably omitted.

In methods of preparation used heretofore, the metal salts, usually metal nitrate hydrates, are heated, usually to about 200° F. to dissolve the salt in the water of hydration, and at least a part of the precipitation is carried out at elevated temperatures. It has now been found that a catalyst of increased activity may be obtained by conducting the preparation at room temperature up to the drying step.

By coprecipitation in accordance with the present invention, various components can be combined in the gel in the desired proportions. Higher proportions of the minor components are possible by coprecipitation than may be obtained by impregnation of the major component or carrier material. The finished gel catalyst may be made up of oxides of various metals, particularly the oxides of beryllium, aluminum, zirconium, vanadium, chromium, molybdenum, and tungsten. In the preparation of the catalyst, a solution of metal salts decomposable on heating to the metal oxides is first made up and then precipitated, preferably in the presence of ammonium nitrate. The metal nitrates are generally preferred, but other decomposable metal salts, for example, acetates, chlorides, and sulfates, may also be used. The chlorides and sulfates are undesirable in the final catalyst; conversion of the chlorides or sulfates to the oxides is preferably carried out in the presence of a stream of gas effecting complete decomposition of the chlorides or sulfates.

In accordance with this invention a mixture of metal salts, preferably metal nitrates, is dissolved in water at room temperature, i. e. 50 to 100° F., preferably also with the addition of ammonium nitrate to the solution. The total concentration of metal salts in the aqueous solution is preferably about 0.25 molar. Precipitation of the metal salts as hydroxides is carried out at room temperature by adding a concentrated solution of an alkali, preferably ammonium hydroxide, rapidly to the aqueous solution without controlled intermediate sol formation. The hydroxide gel so obtained is recovered immediately and dried at about 200° F. Immediate separation of the precipitate from the solution is desirable; the catalyst appears to lose activity if the settling period preceeding separation, usually by filtration, is unduly prolonged. The extraneous salts are removed by thermal decomposition and the gel is further improved by heat treatment at 750° F. The precipitation is preferably carried out batchwise by the addition of a concentrated solution of the precipitant rapidly to the desired quantity of the solution of metal salts with continuous agitation at a relatively rapid rate. The time required for the addition of the precipitant may vary from about 15 minutes to about 2 hours. Catalysts prepared by the method of my invention when compared with catalysts prepared by other methods demonstrate superior activity, efficiency, and effective life.

The preparation of catalysts in accordance with this invention is illustrated by the following procedure for the preparation of a dehydrogenation catalyst containing 50 per cent alumina, 40 per cent chromia, and 10 per cent beryllia.

The desired amounts of metal nitrates, for example, 1656 grams of $Al(NO_3)_3 \cdot 9H_2O$, 947 grams of $Cr(NO_3)_3 \cdot 9H_2O$, and 369 grams of $Be(NO_3)_2 \cdot 4H_2O$, are dissolved in 32 liters of water at room temperature. Preferably ammonium nitrate is added to the solution of metal nitrates. The amount of ammonium nitrate added is not critical. An amount equal to that formed by the reaction of the ammonium hydroxide with the metal nitrates gives a beneficial effect. Higher amounts, up to that sufficient to saturate the solution, may be used if desired. Rapid precipitation of the metal hydroxides is effected at room temperature by the addition, with vigorous stirring, of 57 per cent ammonium hydroxide to the solution of metal nitrates at a rate of 600 ml. per hour. Addition of the concentrated ammonium hydroxide is continued until the pH of the solution is within the range of from about 5.2 to about 8.5. The mixture is immediately filtered at room temperature and the residue is then dried at 200° F. Filtration of precipitate is improved by increasing the pH above about 5.2, the value at which precipitation takes place; a pH above about 6 results in satisfactory filtration. After the material is dried, it is heated, over a period of 30 minutes, to a temperature of 750° F. and is maintained at this temperature for 18 to 36 hours. The catalytic material resulting from the heat treatment is spread in a ¼-inch layer and exposed to air of high relative humidity for an additional 48 hours. The resulting material is then mixed with a binder-lubricant, such as hydrogenated corn oil, hydrogenated peanut oil, or the like, and is ground until about 85 per cent is of 100 to 325 mesh size and the remaining 15 per cent is finer. From this material, pellets are formed which have a crushing strength of 3 to 10 pounds. The binder is burned out in a tubular furnace by heating from 75 to 1000° F. in 3 hours while air is introduced at a space velocity of about 1000 volumes of air per volume of catalyst per hour. The temperature is maintained at 1000° F., while the air flow is continued for 10 to 30 hours. The catalyst is then ready for use.

The following specific examples serve to illustrate the present invention in contrast to prior practices without in any way limiting the scope of the invention.

*Example I*

This example shows that the catalytic activity of a coprecipitated gel catalyst may be increased by precipitating the gels at room temperature.

(a) The preparation of a catalyst containing 10 per cent $Cr_2O_3$ and 90 per cent $Al_2O_3$ as a coprecipitated gel was carried out at 194° F. The sol of each metal hydroxide was prepared separately by dissolving the metal nitrate hydrate in its own water of hydration at 203° F. and adding 70 per cent of the concentrated aqueous ammonia stoichiometrically required for completion of the hydrous oxide formation. The sols were mixed and diluted with hot water. Dilute aqueous ammonia was added to the heated sol mixture until the pH of the mixture was 7.0. The temperature of the gel mixture was maintained at 194° F. during the settling period. The hot gel mixture was filtered and the gel cake was dried at about 194° F. Extraneous salts were thermally decomposed by heating the dry gel in a tubular furnace from 77 to 932° F. in 3 hours. The granular catalyst (8 to 14 mesh rating) was tested using technical normal butane (97 per cent n-butane, 3 per cent isobutane) in alternate 1-hour dehydrogenation and regeneration periods.

(b) A second coprecipitated-gel dehydrogenation catalyst was prepared in the same manner as the catalyst described in part (a) except that the metal nitrates were dissolved in a minimum amount of water at room temperature (77° F.), and the concentrated ammonia was added to the metal nitrate solutions at room temperature. The catalyst was tested under the same conditions as the catalyst of part (a). The per-pass conversion to butylenes plus butadiene was 8.2 per cent higher than for the catalyst of part (a).

*Example II*

This example shows the effect of washing on the activity of coprecipitated-gel catalysts.

Two granular 10% $Cr_2O_3$–90% $Al_2O_3$ coprecipitated-gel type catalysts (8 to 14 mesh) were tested at 1100° F. and a space velocity of 1000 v./v./hr. with technical n-butane. The catalysts were prepared as follows:

(a) A coprecipitated gel prepared by adding ammonium hydroxide to a solution of aluminum and chromium nitrates as disclosed herein, was filtered after a settling period of six days following precipitation. Washing was omitted. After ignition, the resulting catalyst gave a total conversion to butylenes and butadiene of 41.0 per cent and a coke deposit of 3.7 weight per cent of the charge.

(b) A second catalyst, which was prepared by the same procedure used in preparing the catalyst of part (a) except that the coprecipitated gel was washed with six 5-gallon portions of water after filtration, gave a conversion of only 20.9 per cent and a coke deposit of 0.5 weight per cent of the charge.

*Example III*

Two coprecipitated-gel catalysts were prepared which were identical with the exception of the ammonium nitrate content of the gels. Additional ammonium nitrate recovered from the supernatant liquid from previous catalyst preparations was added to the nitrate solution used in preparing one of the catalysts. The compositions of the finished catalysts were approximately 10% BeO–40% $Cr_2O_3$–50% $Al_2O_3$ following ignition of the gel to the oxide form. Technical normal butane was dehydrogenated with the catalysts at 990° F. and a space velocity of 750. Conversions to butylenes plus butadiene of 37.5 per cent for the catalyst prepared without added ammonium nitrate and 38.5 per cent for the catalyst prepared with addition of ammonium nitrate were obtained. A 1-per cent increase in conversion to butylenes plus butadiene was occasioned by the addition of ammonium nitrate to the metal nitrate solution.

The foregoing examples illustrate the improvements in the catalyst obtained by coprecipitation of metal salts to form gel catalysts by the process of my invention. It will be understood that the theories set forth in the foregoing detailed disclosure do not in any way limit the invention and that the examples are given by way of illustrating various advantages of the present invention and are not to be construed as limitations thereof.

I claim:

1. A process for preparing a composite dehydrogenating metal oxide, gel-type catalyst, which comprises preparing a concentrated aqueous solution of soluble metal salts corresponding to the dehydrogenating metal oxides of said catalyst; rapidly precipitating the hydrous metal oxides in the range of 50 to 100° F. and in the pH range of 5.2 to 8.5 with a concentrated solution of ammonium hydroxide; immediately after complete precipitation, recovering the resulting precipitate and drying the same without washing; and calcining the dried, unwashed precipitate at an elevated temperature sufficient to convert the hydrous oxides to catalytic metal oxides but insufficient to deactivate the resulting catalytic composite, until the hydrous oxides are converted to catalytic metal oxides.

2. The process of claim 1 in which the calcination is conducted at a temperature of at least 750° F. for a period of time in the range of 18 to 36 hours.

3. The process of claim 1 in which the metal oxides comprise the oxides of aluminum and at least one of the dehydrogenating metal oxides.

4. A process for preparing a composite metal oxide gel-type dehydrogenation catalyst for changing the carbon-to-hydrogen ratio in hydrocarbons, which comprises preparing a concentrated aqueous solution of soluble metal salts corresponding to the dehydrogenating metal oxides of said catalyst; precipitating the hydrous metal oxides of said metals with a concentrated precipitant in the presence of ammonium nitrate at a pH in the range of 5.2 to 8.5 and at a temperature in the range of 50 to 100° F.; recovering the resulting precipitate and drying the same without washing; and converting the hydrous oxides of the metals to catalytic metal oxides by calcination at elevated temperatures.

5. A process as defined in claim 4 wherein said metal salts are metal nitrates.

6. A process as defined in claim 4 wherein the alkali is ammonium hydroxide.

7. A process for preparing a composite metal oxide gel-type dehydrogenation catalyst which comprises preparing a concentrated aqueous solution of the nitrates of aluminum and the nitrate of at least one dehydrogenating metal; rapidly precipitating the hydrous metal oxides from said solution at a temperature in the range of 50 to 100° F. by admixing therewith a concentrated solution of ammonium hydroxide in an amount regulated so as to establish the pH of the resulting mixture in the range of 5.2 to 8.5; immediately after complete precipitation, recovering the resulting precipitate and drying the same without washing; and calcining the dried precipitate at a temperature of at least 750° F. but below the temperature of deactivation of the catalyst composite for a period between 18 and 36 hours.

8. A process for preparing a composite metal oxide gel-type catalyst which comprises preparing a concentrated aqueous solution of the nitrates of aluminum and chromium at a temperature in the range of 50 to 100° F., rapidly mixing the resulting solution with a concentrated solution of ammonium hydroxide at a temperature in the range of 50 to 100° F. in an amount sufficient to bring the pH of the resulting mixture within the range of 5.2 to 8.5 so as to completely precipitate said metals as hydrous oxides, immediately thereafter recovering the resulting precipitate from its liquor, and drying and calcining the unwashed precipitate at an elevated temperature so as to convert the hydrous oxides to catalytic oxides.

9. The process of claim 8 in which ammonium nitrate is added to the solution of mixed metal nitrates prior to precipitation.

10. The process of claim 8 in which the nitrate of beryllium is incorporated in the solution of mixed nitrates prior to precipitation so as to form a composite including beryllium oxide.

11. A process for preparing a composite metal oxide gel-type catalyst which comprises preparing a concentrated aqueous solution of the nitrates of aluminum, chromium and beryllium at a temperature in the range of 50 to 100° F.; rapidly precipitating said metals from said solution as hydrous oxides by admixing therewith a concentrated solution of ammonium hydroxide at a temperature in the range of 50 to 100° F. and in an amount regulated so as to establish the pH of the resulting mixture in the range of 5.2 to 8.5 and to substantially completely precipitate said metals as hydrous oxides, immediately thereafter recovering the resulting precipitate and drying the same, and calcining the dried precipitate at a temperature of at least 750° F. for a period between 18 and 36 hours.

12. The process of claim 11 in which the ammonium hydroxide is gradually added to said solution over a period of from 15 minutes to 2 hours.

13. A process for preparing a composite metal oxide gel-type catalyst which comprises preparing a concentrated aqueous solution of the nitrates of aluminum, chromium, and beryllium at a temperature in the range of 50 to 100° F., rapidly precipitating said metals from said solution as hydroxides by admixing therewith concentrated ammonium hydroxide in an amount regulated so as to establish the pH of the resulting mixture in the range of 5.2 to 8.5 and to substantially completely precipitate said metal hydroxides, filtering and drying the unwashed precipitate at a temperature of about 200° F., heating the dried precipitate to a temperature of about 750° F. over a period of about 30 minutes and holding the same at this temperature for a time of 18 to 36 hours.

EMORY W. PITZER.

REFERENCES CITED

The following references are of record in the file of this patent:

UNITED STATES PATENTS

| Number | Name | Date |
|---|---|---|
| 1,935,176 | Connolly | Nov. 14, 1933 |
| 2,274,633 | Pitzer et al. | Mar. 3, 1942 |
| 2,322,863 | Marschuer et al. | June 29, 1943 |
| 2,371,087 | Webb et al. | Mar. 6, 1945 |
| 2,377,113 | Thomas | May 29, 1945 |
| 2,382,394 | Bremner et al. | Aug. 14, 1945 |
| 2,393,537 | Huffman | Jan. 22, 1946 |
| 2,395,836 | Bates | Mar. 5, 1946 |
| 2,406,646 | Webb et al. | Aug. 27, 1946 |
| 2,432,286 | Claussen et al. | Dec. 9, 1947 |

FOREIGN PATENTS

| Number | Country | Date |
|---|---|---|
| 537,532 | Great Britain | June 25, 1941 |